UNITED STATES PATENT OFFICE.

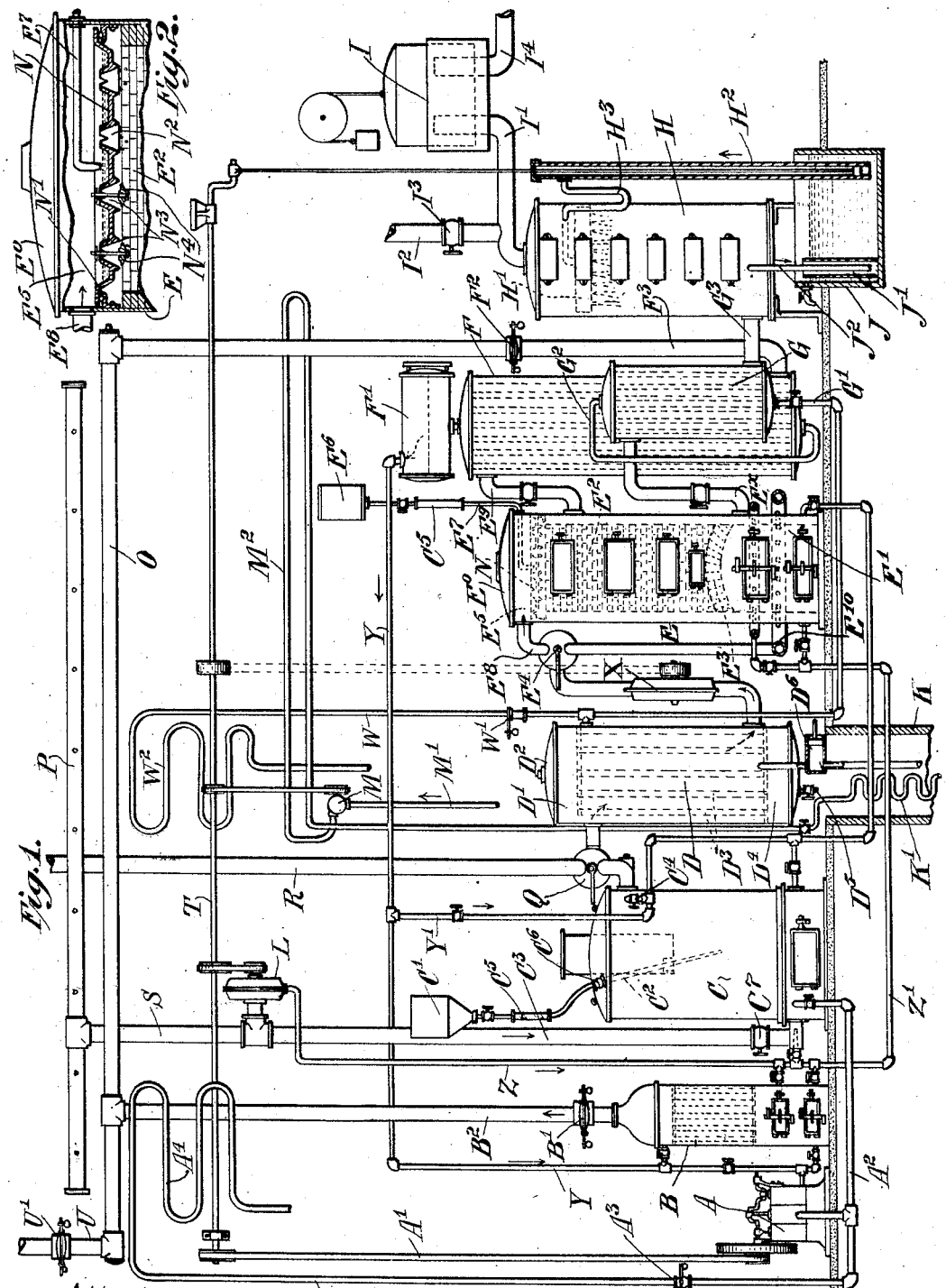

JOSEPH MOSES WARD KITCHEN, OF EAST ORANGE, NEW JERSEY.

GAS-MAKING APPARATUS.

1,039,959.     Specification of Letters Patent.     Patented Oct. 1, 1912.

Application filed April 22, 1911. Serial No. 622,687.

*To all whom it may concern:*

Be it known that I, JOSEPH MOSES WARD KITCHEN, a citizen of the United States, residing in the city of East Orange, county of Essex, State of New Jersey, have invented new and useful Improvements in Gas-Making Apparatus, of which the following is a specification.

In popular usage the word gas is generally intended to mean a combustible gas. Such gases may, and usually do, differ very widely in their composition; and usually are composed of a number of burnable and non-burnable constituents. These constituents are nitrogen, of which from 5 to 60 per cent. may be present; carbonmonoxid in proportions of from 10 to 35 per cent.; carbondioxid in proportions of from 2 to 10 or more per cent., and of hydrocarbons in proportions of from 8 to 50 per cent. In crude, uncleaned gas there are also varying proportions of tar, sulfur and other contaminants of undetermined character, the elimination of which is usually necessary before the gas can be used, and which process of elimination adds much to the cost of producing the gas as a merchantable product. The constituent character of gases largely determines the uses to which they may be applied.

The present invention relates to improvements in the making of fuel gases so-called, which are relatively poor in burnable constituents, as distinguished from so-called illuminating gas, which is rich in the constituents which emit heat and light when burned.

In a general way, the object of this invention is to produce a very low cost gas that can be sold at so low a price as will invite a very large use of the gas, yet which will be sufficiently effective in producing heat when burned as to be suitable in domestic use for cooking, mantle lighting, and to a certain degree, for house or other heating purposes. The making of such gas contemplates the use of solid and liquid fuels of lowest cost, and such as may be difficult to use under ordinary conditions because of physical peculiarities, especially in connection with the formation of smoke. Such fuels comprise soft bituminous, semi-bituminous, lignite, unusually hard anthracite, peat and crude petroleum oils.

Specifically stated, the objects of the invention are to generate the gas in an internally fired gas generator; to regulate the quality of the gas as to richness in burnable constituents; to secure an effective cleaning of the gas from undesirable constituents, such as tarry, ammonical and watery vapors carrying sulfur and other earthy elements, and from dust or other matters which clog engine valves and burners, but as to the exact nature of which no definite knowledge has been acquired.

The most important object of the invention is to prevent those heat and other wastes which are so largely instrumental in adding to the cost of making gas, especially coal gas and water gas.

In order to make my invention better understood, I here define the terms I use as applied to various gases: First:—Coal or illuminating gas is gas volatilized from that part of solid fuel requiring moderate or mild heat to effect the volatilization of the gas from the fuel and which is effected in an externally heated retort, excluding air from the retort. Second:—Water gas is gas which is made by forcing steam through highly heated solid fuel, the steam being decomposed and forming hydrogen gas. The fuel is heated by an intermittently applied air blast through the fuel, which blast is shut off during the time in which the steam is forced through the fuel. Third:—Oil gas is a gas made by volatilizing a hydrocarbon fluid, usually a petroleum oil, and subjecting the volatilized oil to sufficient heat to decompose the oil, thus forming a fixed or permanent gas that will not condense at ordinary temperatures. Oil gas is too rich to use alone, hence water and oil gases are usually made and admixed in one process, and used under the name of carbureted water gas. Fourth:—Producer gas is gas made by passing the heated gaseous products of the complete combustion of a fuel carbon through a thick mass of fuel. In this case, the incombustible carbon dioxid produced by the union of air and carbon becomes changed into a combustible carbon monoxid gas, which gas is admixed with the nitrogen of the air used in the process, some carbondioxid, and considerable contaminating tarry, sulfurous and other vapors. The three last named gases are made by heat generated inside of the devices containing the fuels used in gas making. The amount of heat required to generate the several gases, varies; coal gas being very costly in the use of heat, while producer gas is the least costly. But the most costly gas to produce contains the greatest proportion of combustible constituents, coal gas being from 4 to 6 times as rich in burnable constituents as producer gas. On the other hand, properly cleaned producer gas burns in a more complete and smokeless manner than the hydrocarbon gas made from coal and oil. Whenever producer gas can be used, it is more satisfactory to use than the richer gases. However, as this gas only generates a moderate amount of heat when burned under atmospheric pressure, its use is usually restricted to uses that do not require a richer gas.

To meet a wider range of usage I have designed my apparatus to provide for a wide variation in the richness of quality in the gas made.

My invention provides for the making of water gas, oil gas, carbureted water gas, producer gas, or any desired combination of those gases, as may be best suited to special usages.

The novel means I adopt for carrying out the objects of the invention are numerous in detail, some of which have for purpose the more convenient management of the process of gas making and which are specially of value in small plants where economy of attending labor is desirable or imperative.

The basic gas I usually make is the referred to producer gas which can be used alone, but which has the special property of holding enriching constituents. To this gas I add as much water gas and oil gas as is required, and to which more or less coal gas can also be added.

The invention provides simple, yet effective means for generating with exactness and convenience gas of such character as may be wanted.

This invention corrects faults of design in previous apparatus, which faults have been largely instrumental in preventing a wider spread use of fuel gases. The neglect of economizing the heat wastes of gas making has been specially a fault.

In the present invention I avoid the losses usually experienced in the intermittent blowing or heating of the water gas generator fuel, during which blowing periods a considerable amount of the fuel escapes in the form of carbon monoxid so diluted with nitrogen and carbon dioxid as to be unburnable, and of much heat lost in heating the superheater or which escapes from the newly made gas.

The various improvements effected will be further stated in the specific description of the various elements of the invention.

Referring now to the accompanying drawings: Figure 1, illustrates in elevation, partly in section, and diagrammatically, the invention as applied in a fuel gas plant. Fig. 2, represents on a larger scale than in Fig. 1, and in cross vertical section, the upper part of the gas enricher used.

A is a vertical multiple cylinder steam engine.
B is a steam boiler.
C is a producer gas generator.
D is a condenser of condensable vapors.
E is a superheater for gasifying enriching vapors.
F is a water heater. G is also a water heater.
H is a scrubber.
I is a gas holder and pressure equalizer.
J is a wash water well.
K is a cold water well.
L is an air exhauster and blower.
M is an air compressor.
N is an oil distributing pan.
O is a heat radiating conduit for exhaust gas.
P is an air conduit for warm air for combustion.
Q is a two way gas valve.
R is a purge pipe for exhaust gases.
S is an air conduit.
T is a motive shaft.
U is an exhaust gas stack.
V is an exhaust steam radiator.
W is a hot water conduit and radiator.
X is a gas exhauster and blower.
Y is a steam conduit, and Z is an air conduit.

The basic gas is generated in the producer C, has its tarry and other vapors condensed in the condenser D, is enriched in the superheater and enricher E, is washed in the scrubber H, and is received in the holder I. The gas is drawn through the generator C and the condenser D, and is forced through the superheater E, the economizers F and G, and scrubber H, through the action of the exhauster and blower X, which is actuated from the motive shaft T, which is belt driven by the steam engine A.

The steam engine A is multiple cylindered, and connected by the belt $A^1$ with the motive shaft T. This engine acquires motion initially from the steam boiler B, and later from steam generated from water heated in the economizers F and G, and disengaged in the steam disengagement tank $F^1$. The exhaust steam from the engine A is conveyed by the conduit $A^2$ to the base of the generator C. By means of the pressure regulating valve $A^3$ and the back pressure of the engine, a sufficient amount of pressure of the exhaust steam is maintained to carry it under the grate of the generator C. Any excess of steam not needed for gas generation has its heat radiated in the coil $A^4$, the water of condensation being led to a well not shown in the drawings for clearness and from which it is forced into the boiler B.

The steam boiler may be of any suitable type, but I prefer to use a type in which I apply the principle of what I have named "compressed draft." In this type of boiler, all of the inlets and outlets of the boiler are gas tight against internal pressure of the gases in the gas traversing passages of the boiler. Air for combustion is forced under the grate of the boiler along with as much steam as may be needed to prevent damage to the grate and clinkering from too much heat. Air is also forced in proper amounts above the fuel mass in divided currents and in exact amounts to secure perfect combustion of the gases. The exit of gas from the boiler is through a pressure reduction valve, indicated by $B^1$, and the lower degrees of heat which pass from the boiler are radiated from the conduit $B^2$ controlled by the pressure controlling valve $U^1$.

The gas generator C may be of any type suitable to the fuel used. I prefer to use the generator which is described and claimed in my co-pending application, Serial No. 482,127, in which provision is made for varying the character of the gas made by a controlled admission of air, steam and burned gaseous products of combustion into the base of the device, which device can be run on either the pressure or suction principle. The latter principle is preferred, in which case heated air is drawn by the action of the exhauster X through the conduits P and $C^3$ under the grate of the generator. If forced draft is used, the fan L forces the air through the conduit Z. Besides providing for the introduction of endothermic agents below the fuel mass in the generator, I provide for introducing a heat decreasing agent above the fuel, as by the introduction of steam through the branch steam conduit $Y^1$, and the valve $C^4$. I provide for the consumption of condensed tar and other matter, by running such matters into the center of the fuel mass of the generator C just above the zone of complete combustion, from the reservoir $C^1$ through the conduit $C^2$. The ball and socket valve and union $C^6$ allows for the cleaning of the interior of the conduit $C^2$ through the valve by disconnecting the valve and union. When fire is started in the generator, or when gas production is intermitted, the gases are shunted to the atmosphere through the two way valve Q and the purge conduit R.

Condensing contaminants in the gas is performed in the condenser D: This is of the tubular vertical counter travel type. The gases passing through the valve Q enter the upper gas chamber $D^1$ which has the removable lid $D^2$, and passes downward through the tubes $D^3$ into the lower gas chamber $D^4$. Condensing water is pumped from the well K by the pump $D^6$ into the lower part of the condenser, surrounding the tubes $D^3$ and is forced upward and out through the water conduit W under pressure that is controlled by the reduction valve $W^1$, becoming moderately heated by the sensible heat of the newly generated gas. Some of the water is forced into the lower part of the economizer G and the balance is forced through the radiator coil $W^2$ and is returned to the well K, the connection with which is not shown for sake of clearness in the drawing. If the water for condensing is not cold enough, it is cooled by refrigeration by any desirable method. One method is shown for effecting the cooling. Air is drawn from a low level in the plant through the conduit $M^1$ by the air compressor M, and forced through the pipe $M^2$ radiating heat from the compressed air, and is liberated through the coil $K^1$ in the well K, the liberated exhaust air absorbing heat from the water in the well. Other means for cooling the water may be used. A valve controlled conduit $D^5$ is provided to withdraw condensed matters from the lower gas chamber $D^4$. This condenser is specially used when unenriched producer gas, with or without water gas is generated for engine or other use. When the gas is enriched by oil, the condenser may be omitted, as the elimination of tar and other vapors may be effected in the superheater E, though in using certain grades of enriching oil it is more economical to condense the tar from the gas and then heat the superheater to a low degree for effecting the fixation of the enriching oil.

*Exhausting and forcing the gas.*—In order to prevent escape of gases, it is desirable to practice the principle of using both compression and suction drafts in the gas generator, and to maintain a slightly greater suction draft. In this manner a high heat can be generated in the generator without undesired escape of gases from the generator. If the principle of suction draft through the generator is used, the exhauster and blower X will be located between the generator C and the superheater E, preferably between the condenser D and the superheater, as in that instance the gases under the exhausting influence of the exhauster X are somewhat expanded and reach the exhauster at a more moderate temperature than if the gases were forced through the generator and condenser, and this economizes some heat that would otherwise be lost before the superheater is reached, and preserves the device X from damage from excessive heat. In some cases where much tar is formed in the gases generated, I separate it from the gas by centrifugal action.

*Cooling the gases.*—It will be noted that I generate gas under more or less air pressure forced into the gas generator. The pressure is controlled by the action of the volume blower L, and the heat developed in the generator is determined by the action of that blower and by a constriction in the caliber of the conduit conveying the gas from the generator to the cooler and condenser D at some point in the conduit, as for example the gas passing opening of the valve Q. If desired, the back pressure exerted, may be controlled by a specially inserted valve. One object in cooling the gas, is to prevent damage from high heat to the exhauster and blower X, which is located between the gas generator and the super-heater of the plant. If the gases forced and drawn from the gas generator are not excessively hot, the mere expansion of the gases under the induced draft of the exhauster X will be sufficient to reduce the temperature of the gases after they pass the constricting orifice in the valve Q. If anthracite coal is used in the gas generator, the illustrated provision for cooling the gas is satisfactory; but under some conditions in which very high heat is used in distilling the fuel, and if the saving of the sensible heat of the new gas is not desired, I use steam endothermically above the fuel-mass in the generator. When a bituminous fuel is used which gives off a large amount of tarry vapor, I may free the new gas from tar by means of the ordinary centrifugal device used for that purpose, or I may force the tar laden gas directly into the super-heater. As a rule, where it is practical, I find it desirably economical to pre-heat water in the cooling of the gas, though this economy may be substituted by that of heating air for combustion. After the gas is enriched and super-heated, I again cool the gas so that it may be efficiently used in gas power generation. In effecting this second cooling, I use a water heater G, through which water of a moderately cool temperature is forced, and incidentally economize the heat of the superheated gas by giving the water a heating that is preliminary to its highest heating in the larger heater F, in which the larger volume of heat from the exhaust gases used in heating the super-heater is economized in the highest heating of the water.

*Enriching or fixing condensable vapors in the gas.*—When I desire to enrich the gas I use a device in which is applied the principles of heating the gas and vapors by the burning of fuel auxiliary to fuel burned in the generation of the gas, and of atomizing oil used by blowing the oil with the gas made, securing the expansive influence of the sudden liberation of the compressed blown gas to atomize the oil. The superheater E is provided with a furnace $E^1$ having gas tight ash pit and fuel doors. Air for combustion is forced by the blower L, both below and above the fuel, and steam may be used endothermically under the grate of the furnace to preserve it from damage and prevent clinker formations. In heating the superheater I utilize to a certain degree some of the gas produced in the generator C. To make good gas it is important that its production be continuous in order that a uniform height of heat be maintained in the generator. Hence I provide for an exhaust of the gas into, and for its burning in the super-heater, during the intermissions in which the super-heater is being heated. Producer gas is so poor in heat forming constituents that it is a defective gas for accomplishing work requiring high heat; and furthermore, it is a difficult gas to burn under induced or atmospheric pressures without enrichment. But it can be easily burned under pressure and if undue air dilution of the gas is avoided; and also if a continuous, though even small flame, be maintained in contact with the gas as produced, so as to secure its continuous ignition. This requirement is especially important if the gas is unusually poor in heat forming constituents, as may be the case if such cheap fuels as cinders or coke, are used for generating the gas. I provide means in the super-heater E and elsewhere, for overcoming these difficulties. The furnace $E^1$ not only performs the principal heating of the super-heater, but also continually ignites the waste producer gas that is forced into the lower part of the super-heater by the action of the exhauster and blower X during the intermissions when the gas is not directed by the valve $E^4$ into the upper part of the super-heater. The fuel burned in the super-heater, is burned under a controlled pressure that secures a high heat from the burning of both the gas and the solid fuel used. The interior of the superheater is filled with fire brick checker work $E^2$ resting on the arch $E^3$. The gas enters the gas chamber $E^5$ through the valve $E^4$, and conduit $E^8$ and passes through the oil distributing pan N. Oil is introduced to the pan from the reservoir $E^6$ through the conduit $E^7$. The distributing pan N (see Fig. 2) rests on the annular projection $N^1$ which supports an asbestos packing. The gas being blown by the action of the device X is forced through the oil dripping orifices $N^2$, deflected by the gas deflector $N^4$, and in expanding after passing through these orifices and over the deflector, blows the oil outwardly from the drip projections $N^3$ of the orifices, thus atomizing the oil, which is then in the best condition to be evenly distributed over the heated surfaces of the checker work brick of the super-heater. The drip orifices are extended above the bottom of the pan, and have V-shaped openings through which the oil passes. These openings are sufficiently above the bottom of the pan to allow for the even distribution of the oil from the conduit $E^7$ over the entire surface of the pan, which when inserted in place on the asbestos packing, is leveled so that oil passes equally through all the drip orifices.

It will be understood that the checker brick work is heated intermittently by the burning of fuel in the furnace $E^1$. During the heating process the gas, which is preferably being continually generated in the generator C, is shunted by the action of the gas valve $E^4$ through the conduit $E^{10}$ into the combustion chamber of the furnace $E^1$, where it is burned with air forced above the fuel mass. The pressure of the gases being burned, is controlled by the valve $F^2$, and in this application of "pressure draft" so called, I secure the complete and smokeless combustion of the very lowest cost fuel in the heating of the superheater. The heating gases pass from the superheater through the valve controlled conduit $E^9$. The exit for the gases is at a considerable level below the pan N, and the brick checker work is introduced between that level and the bottom of the pan to prevent carbonization of the oil in the pan from excessive heat. The pan can be reached for cleaning by removing the cover $E^6$. It will be noticed that the oil to be made into gas is first mildly heated by the new gas fuel forced into the chamber $E^5$, and is then progressively heated as it travels downwardly through the checker work. Any constituent that is not volatilized and fixed, gravitates on to the top of the hot fuel in the lower part of the device and is there gasified or burned.

$C^5$ represents glass tubes through which the rate of feeding of fluids to be vaporized may be observed. It is obvious that in fixing vapor in gas making under the method herein described, two superheaters or fixing chambers may be used, they being alternately heated, and then the gas vapors to be heated are alternately passed through the heated fixing chambers.

*Economizing the waste heat to form steam.*—The enriched gas is forced through the exit $E^x$ into the top of the vertical counter travel water heater G and passed downwardly therethrough to the conduit $G^3$ which conveys the gas to the scrubber H. Water which receives its first heating in the condenser D, is forced through the conduit $G^1$ into the bottom of the heater G and therein receives its secondary heating. The water then passes through the conduit $G^2$ into the bottom of the heater F where it receives its highest heating from the hot gases that have heated the superheater E forced through the conduit $E^9$ into the top of the water heater F. The hot exhaust gases pass downwardly through the heater F and are exhausted through the conduits $F^3$, O and U. The pressure of the gases in the heater F is controlled by the reduction pressure valve $F^2$. This pressure reducing valve acts automatically when once set to regulate the pressure of combined air and gas, and of burned gases in the super-heater and the two water heaters of the system. It also acts as a relief valve to prevent the formation of dangerous accumulations of air and combustible gas under pressure, if by chance there should not be a continuous burning of the gases forced into the superheater. Steam is disengaged in the tank $F^1$ from the water that has passed through the heater F and then passes through the steam conduit Y to be used in the engine A or elsewhere in the operation of the plant.

*Scrubbing the gas.*—The gas gets its cleaning from dust in the water scrubber H. The scrubbing water is used circuitously, very large volumes being continuously passed through the scrubber, it being pumped by the pump $H^2$ from the well J through the seal $H^3$ and distribution sectional pan $H^1$ and out through the conduit $J^2$ back to the well J, the scum separator $J^1$ collecting the dust and other matters washed from the gas in the scrubber.

The gas holder I receives the clean gas through the conduit $I^1$ and equalizes its pressure for distribution. If used in a gas engine, I only provide a small holder, the gas being forced to the engine through the conduit $I^4$. I have found that a producer gas engine works better if the gas is mildly forced to the engine under a continuous pressure, and also out through a relief pipe, to secure this effect, I not only provide the telescopic holder I, but also the relief pipe $I^2$ controlled by the valve $I^3$. Any gas passing through this pipe may be exhausted in the atmosphere, or it can be used by burning it in the furnace of the boiler B.

*Utilizing radiated heat.*—In economizing heat I apply the principle of applying waste heat in the accomplishment of work of which the heat is capable of performing. In the structure already described I have provided means for securing a substantially perfect combustion of any fuel, and have applied waste heat of moderate and intense degrees to generate steam which is used in the operation of the plant. With the low degrees of waste heat I heat air for combustion, which I use in the boiler B, the generator C and the superheater E. The low degrees of heat are radiated through the steam coil $A^4$, the water coil $W^2$, the air coil $M^2$ and the conduit O, which latter is controlled by the pressure reducing valve $U^1$. The exhaust gases pass through this valve into the stack U, and when expanded to atmospheric pressure are found to be very cool. These various radiating conduits are arranged at various levels under a peaked roof protecting the plant. Through this arrangement, cool air, which is admitted at a low level of the installation, is progressively heated first by low degrees of heat and then progressively by progressively higher heat, the air most highly heated being buoyantly conveyed upward by the influence of gravity into the apical concavity of the peaked roof from which high level the warm air is drawn through the conduits P and S by the fan L which forces it through the conduit Z to the boiler B, to the generator C, and through the conduit $Z^1$ and the superheater E. In case the producer C is run on the suction principle, the valve $C^7$ is opened and the warm air is drawn all the way through the conduits S and $C^3$.

Through the sum total of the functions of the plant herein described, fuel gas can be made at a very low cost, and although such a plant requires special skill and knowledge to construct, it can be run with a minimum expenditure for labor. Most of the labor used is expended in oiling the motive parts and in feeding and stoking the fires. The control of the valves shunting the gas flow, is effected by connected means not shown in the drawing, and in some cases by electrically actuated means controlled by clock work.

The apparatus herein described, if of a size using less than ten tons of coal per day, can be operated by one man of moderate strength and intelligence, with great exactness and certainty of operation; and the standing costs of operating and maintaining the plant are very small, as the elements outside of the steam engine are subject to very slight wear and do not get out of order.

Inventive subject matter is herein disclosed which is not herein claimed, but which is more or less claimed in my co-pending applications Serial No. 415,983, filed February 14th, 1908; Serial No. 487,694, filed April 3rd, 1909; Serial No. 504,778, filed June 28, 1909, and Serial No. 551,196, filed March 23rd, 1910.

What I claim as new is:—

1. The combination of, (1) a gas generator, and (2) a super-heater for highly heating the gas produced and for transforming tarry or other vapors in said gas into fixed gas, said superheater comprising means for accurately controlling the degree of heat used in transforming said vapors, means for compressing the gas and for compressing air and for admixing the compressed gas and air in desired proportions and for burning said admixed gas and air in the line of travel given to the gas produced and highly heated, said burning of the gas and air heating the super-heater and subsequently heating the gas produced.

2. The combination of, (1) means for generating gas, (2) a super-heater for gasifying and fixing tarry or other vapors in the gas, said superheater being heated by fuel other than the gas generated, and (3) means for economizing the sensible heat of the gas heated in the super-heater, said last named means comprising a steam boiler, steam engine and mechanism actuated by said engine for mechanically securing a flow of the gas from the means for generating gas to and through the superheater.

3. The combination of, (1) a gas generator, (2) a super-heater for highly heating the gas produced, (3) means comprising a gas compressor and an air compressor for feeding gas and air into said super-heater and for controlling separately the amounts of gas and air fed into said super-heater, said gas and air being burned in said super-heater and heating the super-heater, and (4) means beyond the exit of said super-heater for controlling in said super-heater the pressure of the burning gas and air.

4. The combination of, (1) a gas generator, and (2) a super-heater for transforming into fixed gas, vapors carried by the gas generated in the gas generator, said super-heater comprising heat retaining means for super-heating the gas, means for heating the heat retaining means with solid fuel burned in the superheater, means for securing a flow of gas from the gas generator through the super-heater in counter-current to the travel of the gases heating the super-heater, and for controlling the amount of flow of the gases, means for burning gas in the super-heater and for controlling the amount of gas burned, and means for introducing air for burning solid fuel and gases in said super-heater and for separately controlling the amount of air used in burning the solid fuel and in burning the gas.

5. The combination of, (1) a gas generator, (2) a superheater for fixing vapors in the gas generated, (3) means for mechanically securing the conveyance of gas from the generator to and through the super-heater, and (4) an air compressor, said superheater having structure for securing the introduction into the super-heater of the air compressed in many divided streams, and for forcibly admixing the air with the gas to be burned in the super-heater, and for securing a vertically upward travel of the gas and air burned, and for the vertical downward flow of the gas to be heated in the super-heater.

6. The combination of, (1) a gas generator, (2) a combined water heater and condenser for heating water and condensing vapors in the gas generated, (3) an enricher and superheater for enriching the gas with oil vapor and for fixing the oil vapor, and (4) means for mechanically securing an induced flow of the gas from the generator through and from the water heater and condenser, and to and through the enricher and super-heater under forced pressure, said elements co-acting to secure a tar free gas for enrichment with oil in the enricher.

7. The combination of, (1) an internally fired gas generator, and (2) means for introducing a combustible fluid into the center of the incandescent fuel in the generator without direct contact with the upper layers of the fuel in the generator, said means comprising a conduit having a disconnectible union whereby provision is made for the removal at will of carbonized incrustations from the interior of the conduit without disturbing the operation of the gas generator.

8. The combination of, (1) a producer gas generator, (2) means for introducing an endothermic agent both under and above the fuel in the generator, (3) means for cleaning the gas, and (4) means located between the gas generator and the means for cleaning the gas for inducing a flow of gas through the generator and for forcing a flow of gas through the means for cleaning the gas, the introduction of the endothermic agent above the fuel preventing damage from high heat to the means for inducing the flow of and for forcing the flow of gas.

9. The combination of (1) a gas generator, (2) means for heating water with and for cooling the gas from the generator and for condensing vapor in the gas, said means being constructed to pass the gas therethrough in a vertical downward flow in contact with water tubes and other heat transmitting surfaces, all of said surfaces being protected from damaging high heat by water in contact with the sides of the surfaces opposed to the sides in direct contact with the gases, (3) an enricher for the gas, and (4) means located between the first named means and the enricher for drawing the gas through the first named means and for forcing the gas through the enricher.

10. The combination of, (1) a gas generator, (2) means comprising cooling surfaces for cooling the gas generated and condensing vapor in the gas, (3) means for compressing air and for radiating heat from the compressed air, and other means for liberating and expanding the compressed air, said last named means refrigerating water which is used in the means for cooling the gas, and (4) means for securing the conveyance of the gas over and in contact with the cooling surfaces, said refrigerated water and said gas being separated by the cooling surfaces which are impervious.

11. The combination of, (1) a gas generator, (2) means comprising a vertical counter current water heater and gas cooler for cooling the gas generated and pre-heating water, (3) a gas enricher and super-heater for enriching and fixing vapors in the gas, (4) means located between the gas cooler and super-heater for drawing the gas through the gas generator and gas cooling means and for forcing the gas through the super-heater, (5) means for generating steam from the pre-heated water with the heat of the blast gases from the super-heater, and (6) means comprising radiating piping for the higher heating of air for combustion that is preheated by heat radiated from the exterior surfaces of the combination, and (7) means for utilizing the heated air as air for combustion in said combination.

12. The combination of, (1) a gas generator, (2) means comprising a super-heater, for enriching and super-heating the gas generated, said super-heater having means for intermittently heating the same by the burning of gas and solid fuel in the super-heater, and then alternately super-heating the gas generated in the generator; (3) a water heater for economizing the heat of the super-heated gas in heating water, and (4) another water heater for the further and higher heating of the water heated in the first named water heater, said last named water heater being heated by the gases exhausted in the process of heating the super-heater, the two named heaters being connected by a water conduit.

13. The combination of, (1) an internally fired gas generator, (2) means for freeing the gas generated from condensable vapors, (3) means for washing the gas by a circuitous use of washing water, all of said elements radiating heat, and (4) means comprising an exhauster and blower for exhausting from a high level above said elements air heated with radiated heat from said elements and for forcing said heated air into said gas generator and other parts of said combination.

14. The combination of, (1) a producer gas generator, (2) means comprising a gas enricher and super-heater for enriching and super-heating the gas, (3) means for generating steam from the gas generated and from the waste heat of the enricher and super-heater, (4) a boiler for generating steam supplementary to the steam generated by the third named element, (5) an engine for using the steam severally generated, (6) means comprising conveying and radiating piping and an automatically acting pressure controlling valve for conveying live steam and the exhaust steam of said engine to said gas generator and also to said super-heater in desired amounts, and for heating air with steam exhausted from said engine but not otherwise used, and (7) means for forcing the heated air into both the gas generator and into the super-heater in controlled amounts.

15. The combination of, (1) means comprising a gas generator and a super-heater for generating combustible gas, (2) means located between the gas generator and the super-heater for compressing and forcing the gas, (3) means for distributing in a horizontal film, oil for enriching the gas, and for dividing the oil into drops, and for securing a sudden horizontally directed expansion of the compressed and forced gas, and for atomizing the oil drops through such expansion, and (4) means for super-heating the gas and atomized oil for transforming into fixed gas the atomized oil and condensable vapors in the gas.

16. The combination of, (1) a gas generator for generating gas, and (2) means for enriching the gas generated, said means comprising a fire brick filled super-heater, a furnace at a low level of the super-heater, a gas inlet at a high level of the super-heater, a gas inlet at or near the bottom of the super-heater, a high level gas outlet from the super-heater, a low level gas outlet from the super-heater, means for compressing the gas and alternately forcing the gas through the high level and the low level inlets, means for introducing atomized oil at a high level of the super-heater, means for compressing air and introducing the air at a low level of the super-heater, said means co-acting and securing the intermittent heating of the super-heater and the super-heating of the gas and oil in a plunging travel of the intermixed gas and oil through the super-heater.

17. The combination of, (1) a gas generator, (2) an enricher and super-heater for enriching and super-heating the gas generated, (3) a mechanically actuated means for inducing a draft through said gas generator and for forcing a draft through said enricher and super-heater, said means being located between the gas generator and the enricher and super-heater, and (4) means for producing a back pressure of the gases in said enricher and super-heater and for controlling the degree of said back pressure of the gases as they are forced through the enricher and super-heater.

18. The combination of, (1) a gas producer, (2) means for super-heating the gas generated, said means comprising a furnace at a low level of the superheating means for burning solid fuel, (3) means for introducing air for combustion both below and above the fuel in the furnace of said super-heating means, (4) means for forcing the gas generated through the super-heater, and (5) means comprising a regulatable pressure controlling valve for effecting a back pressure of the gases forced through the super-heater and for controlling the amount of compression of the gases in the super-heater.

19. The combination of an internally fired gas generator for generating gas, (2) a water heater for preheating water with the heat of the new gas generated and for cooling the gas, (3) a super-heater for super-heating the gas for fixing vapors in the gas, (4) a water heater for the higher heating of the pre-heated water with the heat of the super-heated gas, (5) another water heater for the highest heating of the water with the heat of the exhaust gases used in heating the super-heater, said three named water heaters being connected with water conduits and constructed and arranged to pass water upwardly through the first named heater, then upwardly through the second named heater, and finally up through the third named heater, and (6) means comprising a back pressure and relief valve for giving high internal compression in the super-heater to the gases burned in the super-heater and also for continuing high pressure of the gases in their travel through the named heaters.

20. The combination of, (1) means for generating a combustible gas, (2) means for compressing the gas and forcing the gas to a gas enricher, (3) said gas enricher which comprises means for feeding oil into the upper level of the enricher, spreading the oil horizontally, dividing the oil into drops and atomizing the oil drops by a sudden horizontal expansion of the gas and for introducing the said admixed gas and atomized oil to a super-heater, and (4) said super-heater which is connected with the enricher, said super-heater super-heating the admixed gas and atomized oil.

21. The combination of, (1) a gas generator, (2) a super-heater for superheating the gas generated, (3) means for pre-heating water with the sensible heat of the super-heated gas, (4) means connected with said super-heater and with said third named element for the higher heating of the pre-heated water, said last named means comprising structure for securing the higher heating of the pre-heated water by the heat of the gases that have heated the super-heater, (5) further means for generating steam, (6) the steam engine for using the steam severally generated, (7) a motor shaft actuated by the steam engine, and (8) means actuated by said shaft for exhausting, compressing and forcing the gas and for securing the regenerative use of waste heat developed in said combination in the generation of and superheating the gas.

22. The combination of, (1) a gas generator, (2) a gas cooler, vapor condenser and water pre-heater connected with said gas generator, (3) means for radiating part of the heat stored in the gas cooler for heating air for combustion, (4) means for utilizing the heated air, (5) means comprising a super-heater for enriching the gas with oil, (6) means for progressive high heating of the pre-heated water with the waste heat of the super-heater, (7) an exhauster and blower located between the gas cooler and the super-heater for exhausting the gas through the generator and through the cooler and for forcing the gas through the super-heater, (8) means for utilizing the heat of the water heated in generating motive power applied in actuating motored elements in said combination, (9) said motored elements, and (10) means for utilizing steam exhausted from the eighth named element in producing gas and regulating combustion in the gas generator.

23. The combination of, (1) a generator for generating at will either producer or water gas, or a combined producer and water gas, (2) means for cooling the newly generated gas, (3) means for enriching and super-heating the gas, (4) an exhauster and blower connected with and located between said generator and said means for superheating the gas for inducing a flow of the gas through the generator and for forcing gas through the enricher and super-heater, and (5) means comprising a back pressure and relief valve for controlling the pressure of the gases passing through the enricher and super-heater.

24. The combination of, (1) means for generating a combustible gas, (2) an enricher and super-heater for enriching the gas with oil and fixing vapors in the gas, said enricher comprising means for distributing the oil at a high level of the enricher, and for the atomization of the oil through the sudden expansion of the gas that has been forced and compressed, said means for forcing and compressing the gas, (3) means at a low level of said super-heater for introducing fuel gas into said super-heater, (4) means comprising a grate and a fire pot at said low level for heating said superheater and for heating and igniting said gas with ignited solid fuel in said fire pot, (5) means for forcing air under control into said super-heater both below said grate and at a level above said fire pot, (6) means for alternately introducing gas into said enricher through said super-heater and out at a low level of the super-heater, (7) means for intermittently securing an exit of exhaust heating gases from a high level of the super-heater, (8) means for securing an exit of super-heated fixed gas from a low level of the super-heater, and (9) means for securing the heating of the super-heater and of the gases heated under the influence of a mechanically produced back pressure.

25. The combination of, (1) a gas generator, (2) means for separating tar from the gas generator, (3) a receptacle at a high level above the generator for holding the tar, (4) a conduit, comprising a sight feed, leading from the receptacle to the center of the fuel mass in the generator, said conduit also comprising means for securing access to the interior of the conduit to remove incrusting carbon in the conduit formed by the heat of the burning fuel.

26. The method herein described pertaining to gas production which consists in, (1) generating a combustible gas, (2) compressing the gas, (3) expanding the gas and atomizing oil drops through the expansion of the gas and admixing the atomized oil drops through the gas, and (4) super-heating under desired pressure the mixed gas and atomized oil for fixing vapors in the gas, said super-heating being effected by heat generated from burning part of the gas and from burning solid fuel, said burning being effected by compressed air forced into intimate contact with the gas and solid fuel burned.

27. The method herein described pertaining to gas production, which consists in (1) continually generating gas, (2) burning part of the generated gas for heating a super-heater and then superheating the other part of the gas in the superheater, (3) preheating water with the heat of the superheated gas, and (4) more highly heating the preheated water with the waste gases burned in superheating the gas.

28. The method herein described pertaining to gas production which consists in generating combustible gas, (2) cooling the gas, (3) forcing the gas, and (4) superheating the gas under a controlled forced pressure and under a controlled back pressure of the gas during its super-heating.

29. The method herein described pertaining to gas production which consists in, (1) generating gas, (2) cooling the gas and heating water from said cooling, (3) enriching and super-heating the gas under pressure above atmospheric and under a back pressure exerted on the gas being super-heated, and (4) giving a high heat to water and forming steam from the hot gases exhausted in the process of super-heating the gas.

30. The method herein described which consists in, (1) continuously generating a combustible gas from a fuel-mass at a uniform rate of air pressure exercised on the fuel-mass, (2) intermittently burning some of the gas under a controlled pressure for generating heat for the super-heating of another part of the gas, and (3) intermittently super-heating the other part of the gas with the heat generated from the burning of some of the gas.

31. The combination of (1) a gas generator and means for forcing air into the generator for the production of gas under pressure, (2) means comprising a super-heater for burning the gas, said means comprising structure for heating and igniting the gas, for pre-heating air and gas burned in said means, for burning the gas, for securing an intimate admixture of the gas and the air and for burning the intermixed gas and air, and for absorbing the high heat of the burning, (3) a water heater and steam boiler for absorbing the lower degrees of heat of the burning, and (4) means for securing at will a back pressure in the elements of the combination, whereby the pressure in the generator, means for burning the gas and means for absorbing the heat generated, is augmented at will.

32. The method herein described, which consists in, (1) maintaining a suction draft from a fuel-mass, (2) maintaining a pressure draft in and through said fuel-mass, and (3) admixing fine particles of fuel, ashes or the like with the fuel-mass to maintain a back pressure in the fuel mass, whereby a higher heat can be maintained in part of the fuel-mass and a greater total volume of heat be maintained in the entire fuel-mass.

33. The combination of, (1) a gas generator, (2) means for cooling the gas generated and for heating water in the cooling of the gas, (3) a super-heater for the gas, (4) a steam boiler and steam engine, (5) a horizontally disposed motive shaft actuated by said engine, (6) a scrubber comprising a pump for cleaning the gas, and (7) connected with and actuated from said shaft, an air exhauster and blower for exhausting heated air and for forcing the air through the gas generator, an exhauster and blower for drawing gas from the gas generator through the means for cooling the gas and for forcing the gas through the super-heater and scrubber and a pump for forcing water through the means for cooling the gas.

JOSEPH MOSES WARD KITCHEN.

Witnesses:
BEATRICE MIRVIS,
GEO. L. WHEELOCK.

---

Copies of this patent may be obtained for five cents each, by addressing the "Commissioner of Patents, Washington, D. C."